United States Patent [19]

Skoff

[11] 4,024,388
[45] May 17, 1977

[54] CORNERING LIGHT SYSTEM FOR TWO-WHEELED VEHICLES

[75] Inventor: Roger E. Skoff, Los Angeles, Calif.

[73] Assignees: Marvin H. Kleinberg, Inc.; Richard Morganstern Inc.; Seymour A. Scholnick, all of Beverly Hills, Calif.

[22] Filed: Mar. 24, 1975

[21] Appl. No.: 561,649

[52] U.S. Cl. .......................... 240/7.55; 240/7.1 R; 240/8.24

[51] Int. Cl.² ...................... B62V 5/00; B60Q 1/12

[58] Field of Search ............ 240/7.1 R, 7.55, 62 R, 240/62.2, 62.4, 58, 8.24

[56] References Cited

UNITED STATES PATENTS

| | | | |
|---|---|---|---|
| 1,458,761 | 6/1923 | Hancock | 240/62 R |
| 1,472,141 | 10/1923 | Showalterbaugh | 240/62 R |
| 1,567,112 | 12/1925 | Calkins | 240/62 R |
| 2,606,999 | 8/1952 | Tostevin | 240/62 R |
| 3,567,918 | 3/1971 | Schable | 240/7.1 R |

FOREIGN PATENTS OR APPLICATIONS

A19,916  8/1965  Germany .......................... 240/7.55

Primary Examiner—George H. Miller, Jr.
Attorney, Agent, or Firm—Seymour A. Scholnick

[57] ABSTRACT

A cornering light system has a left beam and a right beam, each having a novel combination of cross sectional shape and orientation with respect to the vehicle. The cross sectional shape and orientation used have been found to provide optimum illumination of the roadway in the direction of turn. A two-wheeled vehicle necessarily leans toward the inside of the turn when cornering. As the vehicle tilts the appropriate beam is tilted into an efficient orientation for illuminating the roadway. An electrical switch activated by tilt of the vehicle is provided to operate the appropriate beam only when the vehicle is actually cornering.

8 Claims, 13 Drawing Figures

0°, VEHICLE UPRIGHT (NOT TURNING) LATERAL ILLUMINATION IS 100%.

VEHICLE BANKED AT 10° ILLUMINATION INTO TURN NOT AFFECTED.

VEHICLE BANKED AT 22° ILLUMINATION INTO TURN REDUCED BY 22%

VEHICLE BANKED AT 35° ILLUMINATION INTO TURN REDUCED BY 42%

VEHICLE AT 45° PRACTICAL MAXIMUM LEAN ANGLE. ILLUMINATION INTO TURN REDUCED BY 54%.

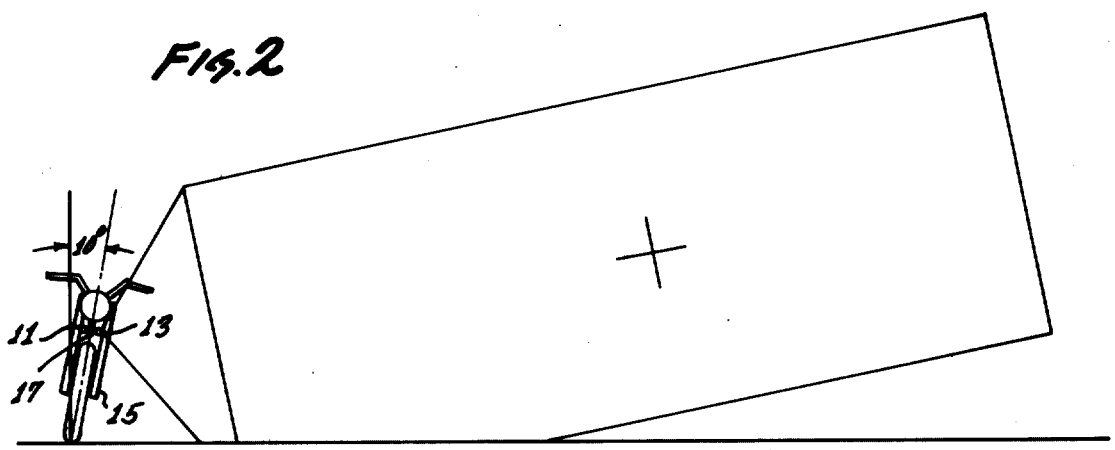
FIG. 2
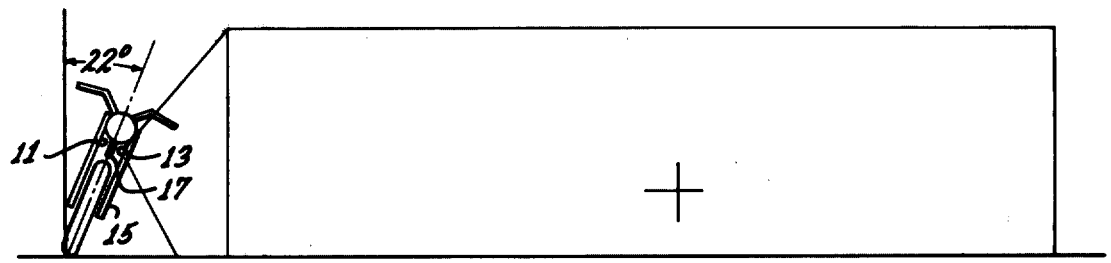
FIG. 3
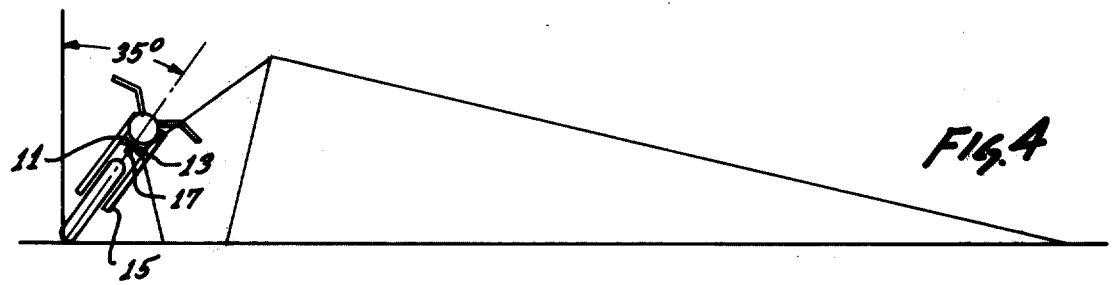
FIG. 4
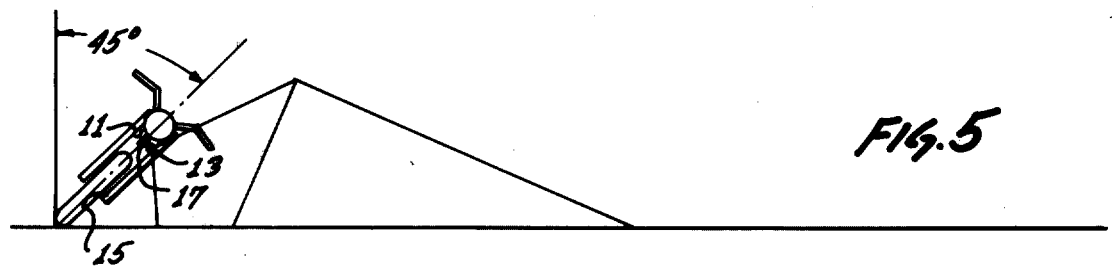
FIG. 5
FEET FROM VEHICLE LONGITUDINAL AXIS AT POINT OF WHEEL CONTACT

CORNERING LIGHT SYSTEM FOR TWO-WHEELED VEHICLES

BACKGROUND OF THE INVENTION

1. Field of the Invention

The present invention relates to a lighting system for use on two-wheeled vehicles, and more particularly to a system including a non-rotatable headlight for mounting on the frame of a two-wheeled vehicle to enable an operator to see hazards lying in his path as the vehicle executes a cornering maneuver. Two-wheeled vehicles tilt toward the inside of the curve when making a cornering maneuver, thereby rendering the conventional headlight mounted thereon ineffective for illuminating the path. The cornering light system of the present invention includes a lamp having a rectangular beam mounted in such a way that its centerline is inclined to the horizontal plane and oriented so that the projection of the centerline onto the horizontal plane forms a predetermined angle with the vehicle longitudinal axis, and whose rectangular cross-section is rotated about the centerline of the beam to a particularly advantageous angle. In operation, the lamp is fixed to the front fork or to the frame of the vehicle and does not rotate with respect thereto, tilting with the vehicle as the vehicle tilts into the corner, and thereby being brought into an orientation effective for illuminating hazards lying ahead on a curved road.

2. The Prior Art

Much work has been done on systems for pivoting automobile headlamps. Unlike a two-wheeled vehicle, an automobile tends to roll outwards during a turn, rather than to tilt into the turn. As a result, systems for pivoting automobile headlamps must invariably direct the beam more and more downwards as the rotating headlight pivots away from its straight ahead position. Therefore, it is necessary to consider only the prior art dealing with two-wheeled vehicles.

U.S. Pat. No. 606,974, issued July 5, 1898, and U.S. Pat. No. 614,733, issued Nov. 22, 1898, both to Leuckert show a compound reflecting surface for use with a non-electric lantern, for producing a beam pattern having side lobes. The lamp cannot be switched off and on easily, and the cross-section of the beam is not canted with respect to its centerline to compensate for tilt of the vehicle as the vehicle rounds a curve.

U.S. Pat. No. 1,710,819, issued Apr. 30, 1929, to Griffin shows a headlight for an automobile which includes two side lights angled at 45° in a horizontal plane from the main light. The side lights are selectively switched off and on by rotation of the steering wheel. The cornering lights are simply uncanted spherical beam headlights and there is no suggestion of canting the beam to compensate for tilt.

A number of patents make use of headlamps which rotate relative to the frame of the vehicle, including U.S. Pat. No. 3,614,416, issued Oct. 19, 1971 to Fleury, U.S. Pat. No. 3,567,919, issued Mar. 2, 1971 to Alpagn and U.S. Pat. No. 3,504,171 issued Mar. 31, 1970 to Martin. Likewise, rotating headlights for bicycles are shown by the following: U.S. Pat. No. 2,335,676 issued Nov. 30, 1943 to Humphrey; U.S. Pat. No. 654,978 issued July 31, 1900 to Henry; U.S. Pat. No. 627,682 issued June 27, 1899 to Chapleau.

U.S. Pat. No. 1,635,393 issued July 12, 1927 to Amans and U.S. Pat. No. 1,593,075 issued July 20, 1926 to Hensley, both relate to headlights for locomotives. They are interesting here in that they both show pendulous means for rotating the headlight as the locomotive rounds a bend. Because the effect of centrifugal force on the pendulous element was not taken into account in the design of these inventions, it would appear that their effectiveness is limited to curves on which the road bed is overbanked.

Thus, it would appear that none of the prior art discloses or suggests the canting of the beam pattern of the cornering lights to compensate for the tilt of a two-wheeled vehicle during a turn.

SUMMARY

Unlike a three- or a four-wheeled vehicle, a two-wheeled vehicle necessarily leans to the inside of the curve while turning. This condition of leaning creates a peculiar and severe problem for the two-wheeled vehicle regarding night-time lighting.

Part of the problem is that the road ahead of the two-wheeled vehicle curves out of the area illuminated by the vehicle's main conventional headlight. This effect is made worse by the peculiar way in which a two wheeled vehicle is caused to turn at high speeds. At high speeds turning is not accomplished by steering or turning the front wheel but rather by leaning. The operator shifts his weight to which ever side he desires to turn, and the vehicle then executes the turn without any significant turning of the front wheel. Thus, the headlight, even if mounted on the front wheel or on the handle bars remains pointed in the direction of the longitudinal axis of the body of the vehicle. As a result, the light beam or the headlight does not anticipate in any way the direction in which the vehicle is turning; in fact, it tends to lag the turning of the vehicle. Moreover, some drivers under some turning conditions find it advantageous to steer in a direction slightly opposite to the direction in which the motorcycle or bicycle is actually turning. This simply aggravates the illumination problem.

The required degree of leaning is proportional to both the speed of the vehicle and the sharpness of the turn. Unfortunately it is precisely under the conditions of high speed and sharp turns that the need for adequate lighting is greatest, and the performance of the conventional headlight is least effective.

To compensate for the functional limitations of conventional lighting systems the present invention is directed towards a cornering light system for two-wheeled vehicles. The system is a preferred embodiment includes two auxiliary cornering lights plus apparatus for mounting the lights to the vehicle and apparatus for controlling the operation of the lights.

Each of the light or lamp assemblies is attached to the front fork or to the frame of the vehicle and does not rotate in any way with respect to that member. It is a point of novelty of the present invention, that the desirable illumination pattern produced by each lamp upon the roadway depends entirely on the tilt of the two-wheeled vehicle as it rounds the curve. This is accomplished by the unique beam direction and cross-section employed by the present invention.

Each lamp is attached to the vehicle in such a way that the projection of the centerline onto the horizontal plane makes an angle of approximately 28° with respect to the forward end of the vehicle's longitudinal axis and in such a way that the centerline of the beam is inclined above the horizontal plane at such an angle that the centerline becomes parallel to the ground when the vehicle is leaned approximately 22° from its normally upright position. About this beam centerline, the cross-section of the beam is substantially rectangular or oblong with its longer axis extending outwardly from the vehicle and upwardly at an angle of 22°, approximately, with respect to the horizontal. The light may not be switched on until the vehicle departs from upright position, and as the vehicle tilts the light is lowered toward the road surface and rotated, whereby the longer dimension of the rectangular crosssection becomes more nearly horizontal.

The effect of this unique beam orientation is to provide increasingly wide angular illumination in the proper direction of turn for vehicle at lean angles up to and including 30° from the vertical. Lean angles of greater than 30° will result in a progressive narrowing of the field of the illumination, but still adequate even at 45°, which is considered the practical maximum lean angle for typical two-wheeled vehicles.

The cornering light system is preferably to operate only when it is actually needed. This may be accomplished through manual switching means or by tilt-sensitive switching means. A manual override switch could also be provided for keeping both lamps on regardless of lean angle.

To comply with existing legislation in some jurisdictions dimming means may also be provided. Dimming may be accomplished by use of a special dimming switch for turning off the cornering lights when their operation could interfere with other drivers, or it may be accomplished by operating the system from the existing high beam circuit of the vehicle headlight, which contains its own dimmer switch.

Thus the present invention provides a cornering light system operable over a wide range of vehicle speeds and turning radii. The system makes use of a pair of headlights which do not rotate with respect to the part of the frame of the vehicle to which they are mounted. Instead, the headlights are canted at an angle which compensates for the tilt of the vehicle when making a turn. The lights may be switched on manually, or by a tilt sensitive sensor. In either case, the switching on of the lights is independent of the rotation of the handle bar.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is a front view showing the cornering light beam when the vehicle is tilted 10°.

FIG. 3 is a front view showing the cornering light beam when the vehicle is tilted 22°.

FIG. 4 is a front view showing the cornering light beam when the vehicle is tilted 35°.

FIG. 5 is a front view showing the cornering light beam when the vehicle is tilted 45°.

DESCRIPTION OF THE PREFERRED EMBODIMENT

The number of two-wheeled vehicles in this country has expanded dramatically in the last decade. All of the motorcycles and many of the bicycles are presently equipped with a headlight for permitting them to be driven at night. Sometimes the headlight is mounted on the body of the vehicle, while in other cases the headlight is mounted on a part of the vehicle, such as the handle bars, which is steered to produce a turn. It is believed that none of these multitudes of vehicles is equipped presently with adequate lights for cornering. The need for adequate cornering lights will be shown in the following paragraphs, and the need is a long-standing one, which the present invention seeks to fulfill.

A description will therefore be given of a particular preferred embodiment of a cornering light system for use with two-wheeled vehicles. The system includes not only its lights, but also the electrical and control apparatus for use with the lights. The theory of the design of the system will be explained, and a number of nonobvious features will be described.

A two-wheeled vehicle turns in a different manner from a three-or four-wheeled vehicle, as will be shown in greater detail below. Probably the most striking difference is that the two-wheeled vehicle tilts into the turn. The major reason for tilting is to permit the weight of the vehicle, assumed to be concentrated at a center of gravity, to be used to counteract centrifugal force acting on the vehicle in a direction towards the outside of the turn. The driver, through reflex action acquired through experience, controls the vehicle so as to achieve a balance between the centrifugal force tending to throw him towards the outside of the curve and the component of his weight which tends to pull the tilted vehicle over toward the inside of the curve. Actually, the situation is more complicated because of the presence of gyroscopic forces, and other effects. The overall result, however, is simply that a two-wheeled vehicle tilts into the turn.

Figure 1:
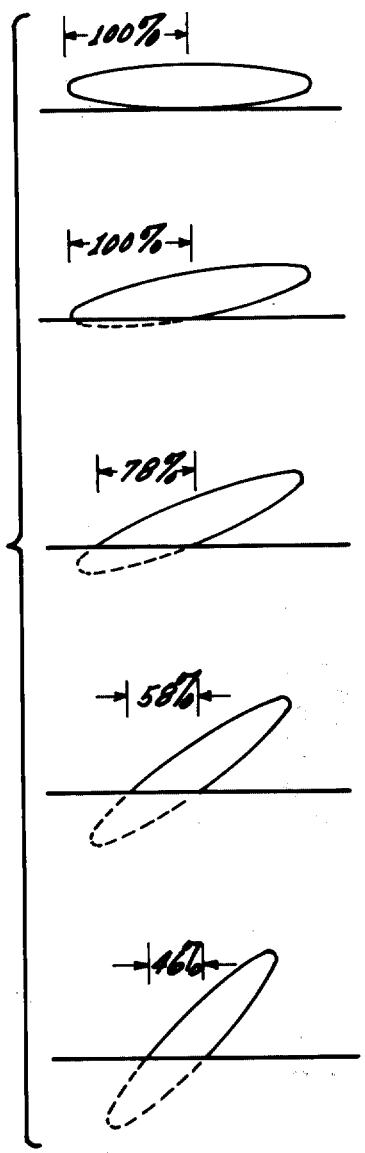
FIG. 1 shows the lighting coverage pattern of a conventional headlight for various lean angels of the vehicle.

The inadequacy of the conventional headlight during cornering of a two-wheeled vehicle is dramatically shown in FIG. 1. That Figure shows the lighting coverage pattern of a conventional 7° by 35° high beam headlight for various lean angles. The coverage patterns are shown as viewed from directly in front of the vehicle and looking horizontally. As the vehicle tilts, first to 10° then 22°, then 35°, etc., the headlight beam pattern, which nominally measures 7° vertically by 35° horizontally, also rotates. This in turn causes the light of the beam to fall on the ground at points progressively closer to the vehcile than desirable. It also has the additional undesirable effect that part of the light beam is elevated and thereby could become a hazard to other drivers. The illumination pattern produced by the conventional headlight during the tilting and cornering maneuver is a highly undesirable pattern. As a general rule, higher vehicle speeds require a greater angle of tilt for a given turn radius. The higher vehicle speed also requires an extended illumination pattern, rather than the reduced pattern produced by the conventional high beam headlight. Thus, the conventional headlight produces a small illuminated area at the very time when an extended area is most desirable. It should be apparent that improvement in the illumination pattern is not to be gained from simply fitting more or brighter headlights. Lack of adequate cornering illumination does not arise simply from an insufficient quantity of available light, but from the inability of conventional lighting equipment to place the quantity of light that is available where it will do the most good in cornering. The present invention accepts the tilting of a two-wheeled vehicle while cornering as a fact of life, and makes use of this effect to produce an illumination pattern that is well adapted to various vehicle speeds and tilt angles.

In the present invention, illumination for cornering is provided through the addition of special lamps 11 and 13 of FIG. 2, associated with the right and left side respectively of the vehicle 15 for making right and left turns respectively. The utility of the present invention derives from the novel illumination pattern developed by each of these lamps. This pattern in turn is partly the result of the unique angle at which the beam of light produced by one of the lamps is pointed and partially by the unique cross-section of the lamp beam pattern. These two innovations enable the cornering light system to produce a highly advantageous pattern of illumination, when mounted on the two-wheeled vehicle in accordance with the embodiment shown below.

The cornering light system produces a pattern of illumination which automatically adapts itself for various vehicle speeds and turning rates, unlike the pattern of illumination produced by conventional headlights. The angle of tilt of the two-wheeled vehicle automatically and necessarily reflects both the speed of the vehicle and the turning rate. If a cornering light were mounted with its beam axis in the forward direction, the beam cross-section could rotate only about that axis as the vehicle tilts. On the other hand, if the cornering lamp were mounted with its beam centerline pointing to the side, at right angles to the longitudinal axis of the vehicle, the beam would dip but would not rotate about its centerline as the vehicle tilts. The cornering light system of the present invention makes use of lamps positioned intermediate the extreme positions just described, to produce a simultaneous dipping of the beam centerline and rotation of the beam cross-sectional pattern about that centerline as the vehicle tilts. It is the simultaneous dipping and rotating of the beam that produces the unique illumination pattern of the present invention.

The precise parameters of the present invention have been determined empirically. It has been found advantageous to arrange for the centerline of the beam of each lamp to be positioned so that the projection of the centerline onto the horizontal plane makes an angle of approximately 28° with respect to the forward end of the vehicle's longitudinal axis and so that the centerline of the beam is inclined above the horizontal plane at such an angle that the centerline becomes parallel to the ground when the vehicle is leaned approximately 22° from its normally upright position. Likewise it has been found advantageous to provide a beam having rectangular cross-section measuring approximately 15° by 45° whose longer dimension is inclined upward away from the vehicle at an angle of approximately 22° with respect to the horizontal plane. It can readily be appreciated, that these numbers can be only approximate, because they are based partially on the preferences of individual drivers and on the concept of providing the best illumination for the type of turn which occurs most frequently. Obviously, the angles mentioned above could be adjusted for non-typical types of driving, such as racing.

FIGS. 2, 3, 4 and 5 show the two-wheeled vehicle 80 in a front view for successive tilt angles of 10°, 22°, 35° and 45°. In these figures it is assumed that the cornering light produces a beam having a well defined cross-section and that the beam is substantially uniformly bright at all points across it. The right top edge of the beam is indicated by 84. The angle between these edges of the beam appear to be much greater than its actual value of 15° because of foreshortening. Numerals 85, 86 and 87 indicate the forward projection of the intersection of the beam with a vertical cylindrical surface located a constant distance of 25 feet from the cornering lamp. As the two-wheeled vehicle 80 tilts from 10° to 22° with respect to the vertical, the beam is seen to be lowered into a more advantageous position for illuminating the area into which the vehicle is turning. The maximum coverage occurs for tilt angles on the order of 22°, which is believed to be the most common tilt angle generally encountered. As the tilt angle further increases beyond 22°, FIGS. 4 and 5 show that the coverage gradually is reduced as the top of the beam 86 is rotated to positions where it strikes the ground closer to the two-wheeled vehicle. Even at a tilt angle as large as 45° as shown in FIG. 5, which is the largest practical tilt angle likely to be encountered, the lateral coverage of the cornering light is still excellent.

Figure 8:
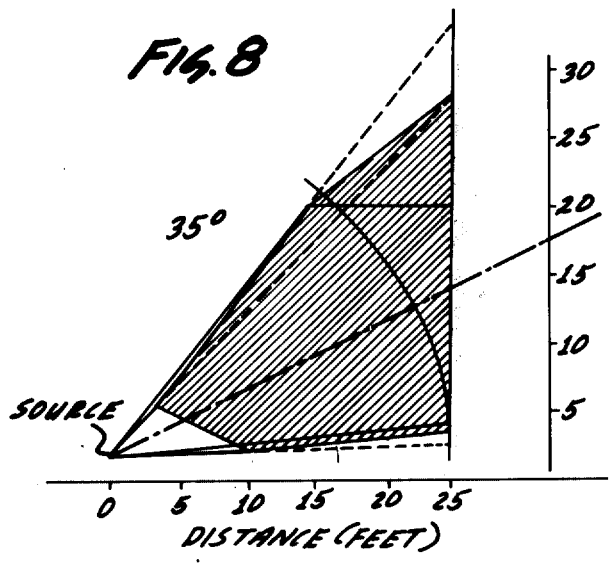
FIG. 8 is a plan view showing the area on the ground illuminated by the cornering light when the vehicle is tilted 35°.
Figure 9:
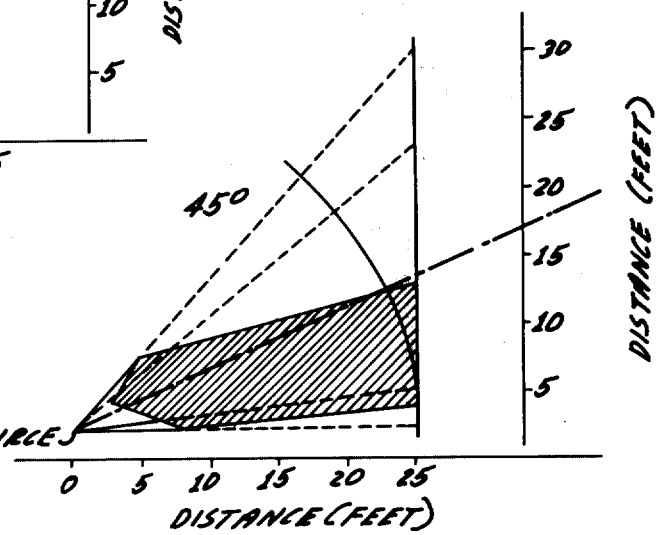
FIG. 9 is a plan view showing the area on the ground illuminated by the cornering light when the vehicle is tilted 45°.

FIGS. 6, 7, 8 and 9 are plan views showing the area on the ground which is illuminated by the cornering light for successive tilt angles of 10°, 22°, 35° and 45°. In these figures, the shaded area indicates the area on the ground which is illuminated. These figures show the advantageous manner in which the pattern on the ground is extended in the direction of the turn as the speed and sharpness of the turn increase up to 22° or more of tilt angle. Even for a tilt angle of 35° as shown in FIG. 8, the lateral coverage is excellent. Beyond 35° of tilt the pattern is diminished somewhat although still adequate even at 45° tilt as shown in FIG. 9.

Figure 13:
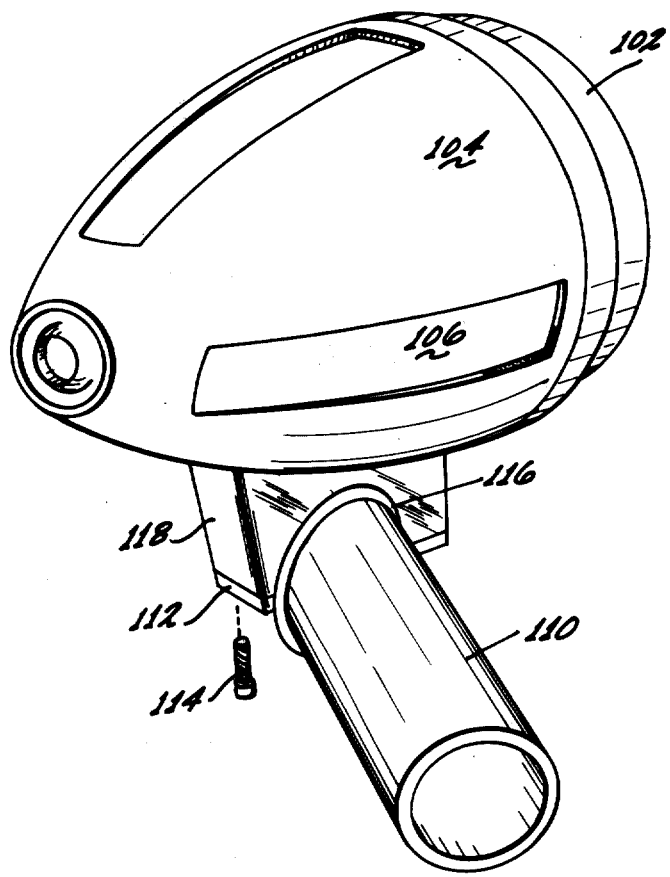
FIG. 13 is a perspective view of a cornering lamp assembly.

The external appearance of one of the light assemblies is shown in FIG. 13 for a preferred embodiment. The light is emitted through a lens at the front end 102 of the assembly. The enclosure 104 has grooves in its surface, of which groove 106 is typical. An aligning block 108 is inserted into one of the grooves and attached therein. This aligning block 108 has a clamping surface cut into it at an angle to assure that the assembly will be pointed in the proper direction when the clamping surface is attached to a horizontal laterally directed member 101 which is mounted on the vehicle. A different shaped aligning block would be used if the lamp is to be mounted to a longitudinally or to a vertically directed member. A clamp 112 is provided to secure the aligning block to the lateral member, and the clamp 112 is held in place by a screw 114. A resilient liner 116 may be provided to prevent sliding and to prevent marring of the lateral member 110. This mounting method is used to attach the light assembly to a horizontal laterally directed bar or tube.

Provided the central direction of the beam of each cornering lamp is maintained at the proper angle, the lamps may be affixed to the vehicle in any position consistent with applicable law. Possible mounting locations include:

a. above, below, or to the sides of an existing headlight
b. to the same mounts as are used for existing turn signals
c. to the handlebars of the vehicle
d. to the front suspension or fork of the vehicle
e. to a fairing
f. to the frame of the vehicle
g. to the front roll bars of the vehicle.

It is obvious that an appropriate connecting structure would be required for each of these possible mounting locations, and it is obvious that some form of universal connecting structure, such as a ball joint with locking means, might be employed.

A further and most useful part of the present invention is the tilt sensitive switch 17 of FIG. 2 which can be arranged to turn on an appropriate cornering light only when the vehicle is leaning at an angle of approximately 10°. Thus, even at night, the cornering lights are not on all the time, but are switched on automatically only when the vehicle is leaning into a turn.

Thus, the combination of carefully devised beam configuration and fully automatic operation produced by the tilt actuated switch, ensures that the cornering light system will provide near-optimum lighting coverage on a demand basis for almost every cornering situation:

Less that 10° Lean Angle — Vehicle is either not turning, or turning very gradually, or at very low speed. Cornering light not needed, not on.
10° Lean Angle — Typically gradual Freeway curve. Cornering light is on. Road contact pattern is narrow and forward. (See FIGS. 2 and 6.)
22° Lean Angle — Normal brisk canyon or mountain road riding. Cornering light is on. Beam is parallel with roadway and road contact pattern is at maximum. (See FIGS. 3 and 7.) AN ESTIMATED 80% OF ALL MOTORCYCLE CORNERING IS DONE AT LEAN ANGLES OF 22° OR LESS.
35° Lean Angle — Sharp low-speed turn on very high speed gradual turn. Cornering light is on. Beam road contact pattern is reduced somewhat from 22°, but still more than adequate, i.e., roughly three traffic lanes wide at 25 feet. (See FIGS. 4 and 8.)
45° Lean Angle — Road racing conditions: either very sharp turn at medium speed or gradual turn at VERY high speed. A very sharp turn means that close-in coverage will be required. For a high-speed gradual turn little additional width of coverage is required, but must must be done to overcome lateral beam obscurance of headlight. In either case, the road contact pattern of the proposed motorcycle cornering light is nearly ideal. (See FIGS. 5 and 9.)

The electrical system of the cornering light system includes several novel optional features. The system can be wired into the high beam circuit of the vehicle to which it is mounted. Thus, dimming or dipping the headlight beam for oncoming traffic will switch off the cornering lights at their source and ensure that, regardless of the vehicle's lean angle, the cornering lights will not come on and, therefore, cannot dazzle other drivers. A manual on-off switch can be provided to enable the system such as shown at 31. Once that switch is turned on, the operation of the system will be controlled by an acceleration or tilt activated switch, which automatically turns on the appropriate cornering light in response to "g" forces or tilting of the vehicle as it makes a turn.

Left and right manual override switches could also be provided, as at 33 and 35, to keep either or both lights on regardless of lean angle.

Figure 10:
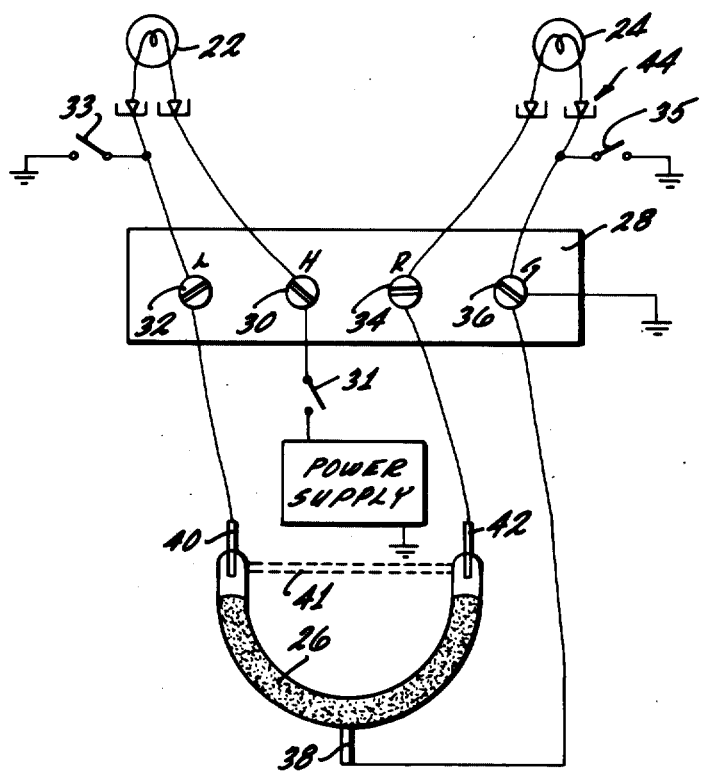
FIG. 10 is an electrical circuit diagram showing how the tilt actuated switch is connected to the cornering light circuit.

FIG. 10 is an electrical diagram showing the interconnection of the left and right cornering lamps 22 and 24 respectively, with the tilt sensing switch 26 through a terminal board 28. One lead from each of the lamps 22 and 24 is attached to a common terminal 30 which is supplied with current from a suitable power supply through a manual "off-on" switch 31. That power supply might alternatively be a battery, a generator or alternator, or the high beam headlight circuit of the vehicle.

In some States it is required that auxiliary lamps mounted on a vehicle must not cause a glaring light projected into the eyes of an approaching driver. Supplying the current from the high beam headlight circuit of the vehicle ensures that the cornering lights cannot dazzle approaching drivers because dipping the headlight for oncoming traffic will switch off the cornering lights at their source. The other lead from each lamp is connected to a terminal of the tilt actuated switch 26 through appropriate terminals 32 and 34 on the terminal board 28. The common terminal 38 of the tilt actuated switch 26 is connected to terminal 36 on the terminal board. Terminal 36 is also connected to the chassis. The lamps 22 and 24 are connected to leads running to the terminal board 28 through bullet connectors of which 44 is typical. The U-shaped mercury tube 26 is affixed to the vehicle in an upright position and in a plane generally normal to the longitudinal axis of the vehicle.

FIG. 10 shows a single pole double throw tilt actuated switch 26. It is obvious that other types of tilt actuated switch could be used in place of one illustrated. For example, two single pole single throw switches could be used in place of the single pole double throw switch illustrated, and the position of the electrodes within the switch can be chosen to suit the specific mounting angle in a particular application. The mercury switch 26 would have to be evacuated if constructed as shown to avoid the effects of the pressure of the gas which would otherwise be confined at the ends of the mercury columns and the ends of the U-tube. An alternative embodiment avoids this problem and the necessity for evacuating the U-tube by including a pressure equalizing tube 41 of FIG. 10 which permits the confined gas volumes in the ends of the U-tube to communicate with each other. Further, the mercury switch of FIG. 10 could be replaced by a manually-operated turn-signal type of SPDT switch. Finally, a vertical gyro could be used to give a true vertical reference from which tilt angles could be measured for use in actuating the switches which control the operation of the turning lamps.

It is by no means obvious that a mercury or similar acceleration sensitive switch can be used to regulate the operation of the cornering lamps for use on a two-wheeled vehicle. The effective acceleration vector is defined as the resultant of the weight vector and the centrifugal force vector and it represents the effective gravity or "g" force acting upon the vehicle. At first glance, it might appear that the vehicle would tilt, when rounding the corner, to an angle aligned with the effective acceleration vector. If this were the case, an accleration activated switch would not be effective. For example, the length of the mercury columns in U-tube would reach a balanced position relative to the enclosing U-tube. In that position, the configuration of the mercury columns within the enclosure would be identical to the configuration reached with the U-tube in the untilted attitude and with the vehicle stationary. Thus, it is by no means obvious how an acceleration sensitive switch can operate in the present invention to sense the angle of tilt.

Nevertheless, after much testing, it has been discovered by the present inventor that a U-tube mercury switch can indeed be used in the described manner to sense the tilt. This is an unanticipated and surprising discovery and no proven theory has yet been developed to account for the phenomenon.

It has been proposed by the present inventor that the observed operation of the mercury switches can be accounted for by the following statement of theory of operation: A two-wheeled vehicle is caused to turn by the operator shifting his weight to one side or the other. A turn could be initiated even if the steering mechanism and handlebars were welded in the straight-ahead position with the front wheel lying in the same plane as the rear wheel. In turning, the two-wheeled vehicle can be thought of as undergoing an infinite number of successive infinitesimal falls. During this falling motion the two-wheeled vehicle leans beyond the direction of the resultant "g" force vector. The mercury in a mercury switch responds to the resultant "g" force vector by seeking a level which is in a plane perpendicular to the "g" force vector. Because the mercury switch is attached to the frame of the vehicle, the level of the mercury column relative to the tube appears to rise in the right hand tube when the vehicle is executing a right turn and to rise in the left hand tube when the vehicle is executing a left turn.

Figure 11:
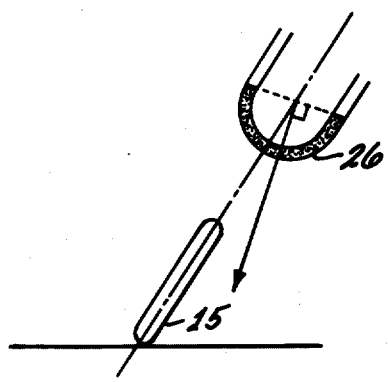
FIG. 11 is a rear view of the vehicle executing a right turn, showing the relationship between the effective "g" force vector and the tilt of the vehicle.
Figure 12:
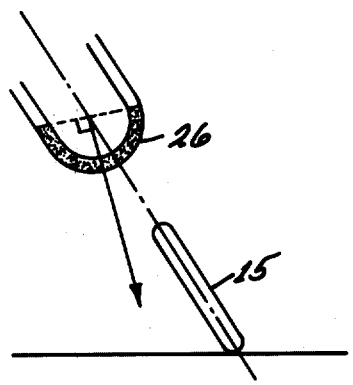
FIG. 12 is a rear view of the vehicle executing a left turn, showing the relationship between the effective "g" force vector and the tilt of the vehicle.
Figure 6:
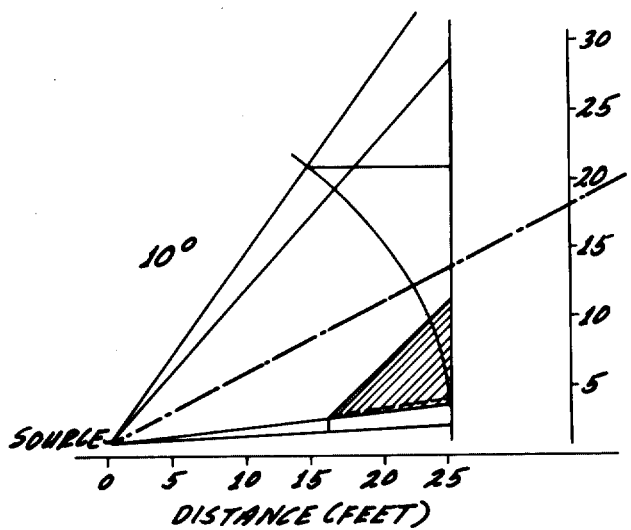
FIG. 6 is a plan view showing the area on the ground illuminated by the cornering light when the vehicle is tilted 10°.
Figure 7:
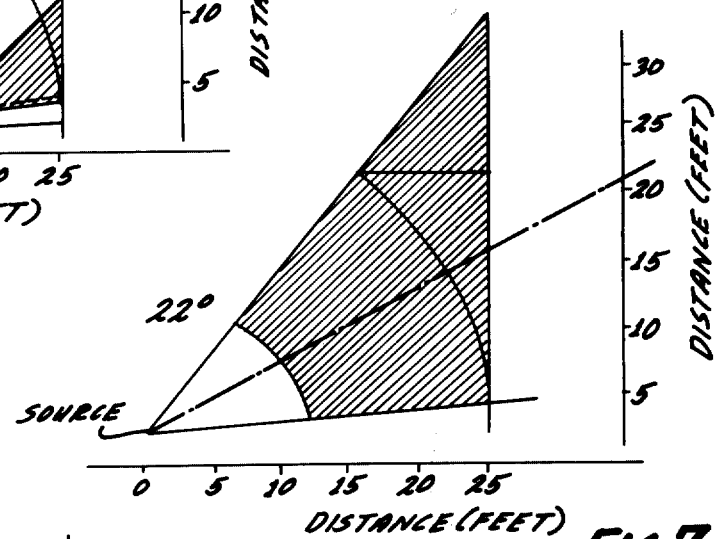
FIG. 7 is a plan view showing the area on the ground illuminated by the cornering light when the vehicle is tilted 22°.

The observed result is as shown in FIG. 11 for a right turn and FIG. 12 for a left turn. For proper operation, the cornering lamps are preferably connected to the mercury switch as shown in FIG. 10.

Thus, there has been described a preferred embodiment of a cornering light system for a two-wheeled vehicle. One unique feature of the system is the use of a beam whose centerline and cross section are chosen to permit maximum illumination of selected areas on the ground when the vehicle is rounding a corner at a tilted attitude. A second unique feature is the use of a tilt actuated switch for controlling the operation of the cornering lights. The switch automatically determines which cornering light will turn on, and keeps the light on only while the vehicle is actually turning.

In alternative embodiments, the centerline of the beam may be inclined to the horizontal plane at angles between 0° and 30° when the vehicle is in the upright position. A unique advantage results if the beam centerline is positioned to lie in the horizontal plane when the vehicle is upright. The mechanical means used to rotationally position the elongated dimension of the beam cross section about the beam centerline can be identical for both the left and right cornering lamps, thereby avoiding the cost of manufacturing separate left and right parts.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. For use in combination with a two-wheeled vehicle a cornering light system comprising:
   a lamp assembly including a lamp energizable to emit a light beam of predetermined configuration, and means for fixedly mounting said lamp on said vehicle, said mounting means holding said lamp so that if energized when the vehicle is upright and oriented to move straight ahead, the center of said light beam is directed forward slantingly toward one side of the vehicle and with an upward incline, and means operable for energizing said lamp during a turn of the vehicle, whereby when the vehicle tilts to one side during a turn, the light beam will be directed to one side and its upward incline will be dropped to illuminate the road onto which the turn is being made.

2. The combination described in claim 1 wherein:
   said lamp is constructed to emit a light beam which has a cross-section of relatively large width and a much smaller height, and said lamp is mounted so that the width dimension of the beam is not horizontal but instead is angled upward from its forward end toward its rearward end, whereby when the vehicle tilts during a turn, the beam width dimension is rotated more closely toward the horizontal to illuminate the road onto which the turn is being made.

3. The combination described in claim 1 wherein:
   the central direction of the beam of light is upwardly inclined when the vehicle is in its normally upright position, at such an angle that when the vehicle is tilted sidewards approximately 22°, the central direction of the beam then lies substantially parallel to the ground.

4. The system of claim 1 wherein said means for energizing said lamp is a manually operable electric switch for applying electric current to said lamp.

5. The system of claim 1 wherein said means for energizing said lamp is an automatically operated tilt sensitive electrical switch responsive to the tilt of the vehicle during a turn for applying electric current to said lamp during the turn.

6. The system of claim 5 wherein said tilt responsive electrical switch comprises an arcuate tube having substantially upright right and left side arms interconnected by a trough receiving a pool of conductive liquid, the plane of said arms being aligned substantially perpendicular to the fore and aft axis of the vehicle, an electrical contact in said right side arm engageable by said conductive liquid when the vehicle tilts to the right, and an electrical contact in said left side arm engageable by said liquid when the vehicle tilts to the left.

7. A cornering light system for a two-wheeled vehicle which has a source of electricity comprising:
   a lamp assembly including a lamp and means for fixedly mounting said lamp on said vehicle with the lamp facing to one side of the vehicle, when the vehicle is upright and oriented to move straight ahead; and
   a tilt sensing switch coupling the source of electricity to said lamp, said switch being constructed to close when said vehicle tilts towards said side.

8. The system described in claim 7 including:
   a two-wheeled vehicle; and wherein
   said lamp is mounted so that said lamp is oriented to emit a light beam at an upward incline, if energized when the vehicle is upright and oriented to move straight ahead.

* * * * *